(12) United States Patent
Zhao (10) Patent No.: US 9,930,126 B2
(45) Date of Patent: Mar. 27, 2018

(54) ELECTRONIC APPARATUS AND INFORMATION PROCESSING METHOD

(71) Applicant: Lenovo (Beijing) Co., Ltd., Haidian District, Beijing (CN)

(72) Inventor: Yan Zhao, Beijing (CN)

(73) Assignee: LENOVO (BEIJING) CO., LTD., Haidian District, Beijing (CN)

(*) Notice: Subject to any disclaimer, the term of this patent is extended or adjusted under 35 U.S.C. 154(b) by 191 days.

(21) Appl. No.: 14/978,779

(22) Filed: Dec. 22, 2015

(65) Prior Publication Data
US 2017/0093990 A1    Mar. 30, 2017

(30) Foreign Application Priority Data

Sep. 25, 2015    (CN) .......................... 2015 1 0624733

(51) Int. Cl.
| | |
|---|---|
| H04L 29/08 | (2006.01) |
| G06F 3/01 | (2006.01) |
| H04W 64/00 | (2009.01) |
| H04W 4/02 | (2018.01) |
| H04W 4/00 | (2018.01) |
| H04W 4/20 | (2018.01) |

(52) U.S. Cl.
CPC .............. *H04L 67/16* (2013.01); *G06F 3/016* (2013.01); *H04W 4/008* (2013.01); *H04W 4/027* (2013.01); *H04W 4/206* (2013.01); *H04W 64/00* (2013.01)

(58) Field of Classification Search
None
See application file for complete search history.

(56) References Cited

U.S. PATENT DOCUMENTS

| | | | | |
|---|---|---|---|---|
| 7,669,459 B2 * | 3/2010 | Yoshihara | ............. | G01L 23/225 73/35.06 |
| 7,945,379 B2 * | 5/2011 | Kaneko | ................. | G01L 23/225 123/406.34 |
| 9,110,663 B2 * | 8/2015 | Gyorfi | ..................... | G06F 9/542 |

(Continued)

FOREIGN PATENT DOCUMENTS

| | | |
|---|---|---|
| CN | 103885896 | 6/2014 |
| CN | 104252227 | 12/2014 |

OTHER PUBLICATIONS

First Office Action dated Sep. 1, 2017 (14 pages including English translation) out of Chinese priority Application No. 201510624733.7.

*Primary Examiner* — Ninos Donabed
(74) *Attorney, Agent, or Firm* — Brinks Gilson & Lione; G. Peter Nichols (57) ABSTRACT

An electronic apparatus and an information processing method, which are related to a field of electronic technique, are described. The electronic apparatus includes a first sensing unit configured to sense first sensing data representing an action of the electronic apparatus; a communication unit for broadcasting a first identification information itself and the first sensing data sensed by the first sensing unit to an external second apparatus, and receiving a second identification information and a second sensing data broadcasted from the external second apparatus; and a control unit for controlling the electronic apparatus to execute a preset operation based on a decision result whether the first sensing data and the second sensing data satisfy predetermined conditions.

13 Claims, 3 Drawing Sheets

(56) References Cited

U.S. PATENT DOCUMENTS

| | | | | |
|---|---|---|---|---|
| 2005/0199061 | A1* | 9/2005 | Acar | G01C 19/5719 73/504.02 |
| 2008/0143676 | A1* | 6/2008 | Choi | G06F 3/017 345/158 |
| 2008/0210005 | A1* | 9/2008 | Rougeot | G01C 19/5747 73/504.12 |
| 2008/0281235 | A1* | 11/2008 | Cowin | A61B 5/1071 600/595 |
| 2010/0246847 | A1* | 9/2010 | Johnson, Jr. | H04R 1/1041 381/74 |
| 2011/0054822 | A1* | 3/2011 | Bauschke | G01K 1/08 702/99 |
| 2012/0061172 | A1* | 3/2012 | Yacine | G01C 19/5747 181/121 |
| 2012/0153748 | A1* | 6/2012 | Wauke | H02K 33/16 310/25 |
| 2013/0288859 | A1* | 10/2013 | Watterson | A63B 24/0062 482/8 |
| 2014/0357185 | A1 | 12/2014 | Li | |
| 2015/0042573 | A1* | 2/2015 | Grant | G06F 3/016 345/173 |
| 2015/0181634 | A1* | 6/2015 | Cheng | H04W 4/008 455/426.1 |

* cited by examiner

ELECTRONIC APPARATUS AND INFORMATION PROCESSING METHOD

This application claims priority to Chinese Patent Application No. 201510624733.7 filed on Sep. 25, 2015, the entire contents of which are incorporated herein by reference.

This disclosure relates to a field of electronic technology, and more specifically to a field of recognition and interaction between electronic apparatus.

BACKGROUND

Requirements of recognition, interaction and data sharing and participating between one apparatus and another apparatus are more and more in real life. How to make intelligent recognition, interaction and data sharing and participating between one apparatus and another apparatus to be more portable and make an experience of applications more humanized gets our attention and are desired to be solved urgently.

For example, most modes of recognition of current apparatus are mainly controlled manually, and most modes of current data transmission are also mainly controlled manually which includes copying, pasting, transmitting and the like. However, with such manner, a user needs to carry out complex and cumbersome steps to implement recognition and data transmission between one apparatus and another apparatus. Thus, both of convenience and experience of the user are poor.

SUMMARY

In view of above, it is desirable to change such mode of control and interaction, to provide a new mode of control and interaction which is more convenient and more humanized.

According to an aspect of this disclosure, there is provided an electronic apparatus including: a first sensing unit for sensing a first sensing data for representing an action of the electronic apparatus; a communication unit for broadcasting a first identification information of its own and the first sensing data sensed by the first sensing unit to an external second apparatus, and receiving a second identification information and a second sensing data broadcasted from the external second apparatus; and a control unit for controlling the electronic apparatus to execute a preset operation based on a decision result whether the first sensing data and the second sensing data satisfy a predetermined condition.

Further, in the electronic apparatus according to the embodiments of this disclosure, the communication unit is further configured to transmit the first sensing data and the second sensing data to an external third apparatus connected thereto, and receive command information transmitted from the third apparatus; wherein the external third apparatus is configured to analyze the first sensing data and the second sensing data, decide whether the first sensing data and the second sensing data satisfy the predetermined condition and transmit the command information indicating a decision result to the electronic apparatus.

Further, the electronic apparatus according to the embodiments of this disclosure may further include: a processing unit for analyzing the first sensing data and the second sensing data to decide whether the first sensing data and the second sensing data satisfy the predetermined condition; wherein the control unit controls the electronic apparatus to execute a first preset operation when the processing unit decides that the first sensing data and the second sensing data satisfy the predetermined condition.

Also, in the electronic apparatus according to the embodiments of this disclosure, the first sensing unit includes a vibration sensor, the first sensing data includes a first vibration frequency and the second sensing data includes a second vibration frequency, and the predetermined condition includes a difference between the first vibration frequency and the second vibration frequency being less than a first threshold.

Also, the electronic apparatus according to the embodiments of this disclosure may further include: a first positioning unit for acquiring first position information of the electronic apparatus, wherein the communication unit is further for receiving second position information of the second apparatus broadcasted from the second apparatus; the predetermined condition further includes a distance between positions represented by the first position information and the second position information being less than a second threshold.

Also, the electronic apparatus according to the embodiments of this disclosure may further include: a third sensing unit for sensing third sensing data representing the action of the electronic apparatus, wherein when the processing unit determines that the first sensing data and the second sensing data satisfy the predetermined condition, the communication unit is further configured to establish a point-to-point connection with the second apparatus based on the second identification information and receive fourth sensing data from the second apparatus, wherein the third sensing data and the fourth sensing data are sensing data of same type; and the processing unit is further configured to compare the third sensing data and the fourth sensing data and determine whether the third sensing data and the fourth sensing data are matched, and the communication unit is further configured to disconnect the point-to-point connection with the second apparatus when the processing unit determines that the third sensing data and the fourth sensing data are not matched, and to maintain the point-to-point connection while the processing unit determines that the third sensing data and the fourth sensing data are matched.

Also, the electronic apparatus according to the embodiments of this disclosure may further include an acceleration sensor and a gyroscope for acquiring first acceleration information and first moving direction information of the electronic apparatus, respectively; wherein, the communication unit is further for receiving second acceleration information and second moving direction information of the second apparatus broadcasted from the second apparatus.

Also, in the electronic apparatus according to the embodiments of this disclosure, the processing unit is further for acquiring a first moving track based on the first position information, the first acceleration information and the first moving direction information and acquiring a second moving track based on the second position information, the second acceleration information and the second moving direction information, and deciding whether there is an intersecting point of the first moving track and the second moving track; correspondingly, the predetermined condition further includes that there is the intersecting point of the first moving track and the second moving track.

Also, the electronic apparatus according to the embodiments of this disclosure may include; a body device; a fixing device connected to the body device and for fixing a relative position relationship with a user of the electronic apparatus; wherein the first sensing unit is positioned at the body device or the fixing device, and the communication unit is positioned at the body device or the fixing device, and the control unit is positioned at the body device or the fixing device.

According to another aspect of this disclosure, there is provided an information processing method applied in an electronic apparatus including: sensing first sensing data representing an action of the electronic apparatus; broadcasting first identification information itself and first sensing data sensed to an external second apparatus and receiving second identification information and second sensing data broadcasted from the external second apparatus; and executing a preset operation based on a decision result whether the first sensing data and the second sensing data satisfy a predetermined condition.

Also, the method according to the embodiments of this disclosure may further include: transmitting the first sensing data and the second sensing data to an external third apparatus connected thereto and receiving command information transmitted by the third apparatus, wherein the external third apparatus is configured to analyze the first sensing data and the second sensing data, decide whether the first sensing data and the second sensing data satisfy the predetermined condition and transmit the command information indicating the decision result to the electronic apparatus.

Also, the method according to the embodiments of this disclosure may further include: analyzing the first sensing data and the second sensing data to determine whether the first sensing data and the second sensing data satisfy the predetermined condition; and executing a first preset operational when it is decided that both of the first sensing data and the second sensing data satisfy the predetermined condition.

Also, in the method according to the embodiments of this disclosure, the first sensing data includes a first vibration frequency and the second sensing data includes a second vibration frequency, and the predetermined condition is a difference between the first vibration frequency and the second vibration frequency being less than a first threshold.

Also, the method according to the embodiments of this disclosure may further include: acquiring first position information of the electronic apparatus and receiving second position information of the second apparatus broadcasted from the second apparatus, wherein the predetermined condition further includes a distance between positions represented by the first position information and the second position information being less than a second threshold.

Further, the method according to the embodiments of this disclosure may further include: sensing third sensing data representing the action of the electronic apparatus, establishing a point-to-point connection with the second apparatus based on the second identification information when it is determined that the first sensing data and the second sensing data satisfy the predetermined condition, and receiving fourth sensing data from the second apparatus, wherein the third sensing data and the fourth sensing data are sensing data of same type; comparing the third sensing data and the fourth sensing data and determining whether the third sensing data and the fourth sensing data are matched, and disconnecting the point-to-point connection with the second apparatus when it is determined that the third sensing data and the fourth sensing data are not matched, and maintaining the point-to-point connection when it is determined that the third sensing data and the fourth sensing data are matched.

Also, the method according to the embodiments of this disclosure may further include: acquiring first acceleration information and first moving direction information of the electronic apparatus; receiving second acceleration information and second moving direction information of the second apparatus broadcasted from the second apparatus.

Also, the method according to the embodiments of this disclosure may further include: acquiring a first moving track based on the first position information, the first acceleration information and the first moving direction information, and acquiring a second moving track based on the second position information, the second acceleration information and the second moving direction information; deciding whether there is an intersecting point of the first moving track and the second moving track; correspondingly, the predetermined condition further includes that there is the intersecting point of the first moving track and the second moving track.

In the electronic apparatus and the information processing method according to the embodiments of this disclosure, by aid of broadcasting the sensing data indicating the action of the apparatus with the apparatus identification together and executing the preset operation between the two apparatuses based on whether the sensing data of one of the two apparatuses and the sensing data of the other of the two apparatuses are matched, the preset operation related to the second apparatus can be executed automatically once the user performs a specific simple action (for example, touch the electronic apparatus with the second apparatus), thus improving user convenience of usage of the apparatus and user experience of the usage of the apparatus.

DETAILED DESCRIPTION

The respective preferable embodiments of this disclosure are described with reference to the accompanying drawings hereinafter. The description with reference to the accompanying drawings is provided hereinafter to help to understand the exemplified embodiments of this disclosure defined by the claims or the equivalent. It includes various kinds of specific details helping understanding which are only regarded as illustrative. Therefore, those skilled in the art would recognize that the embodiments described herein can be made various kinds of alternations and modifications without departing from scope and spirit of this disclosure.

Further, in order to make the specification more clear and brief, the detailed description on the well-known functions and structures in the art would be omitted.

Figure 1:
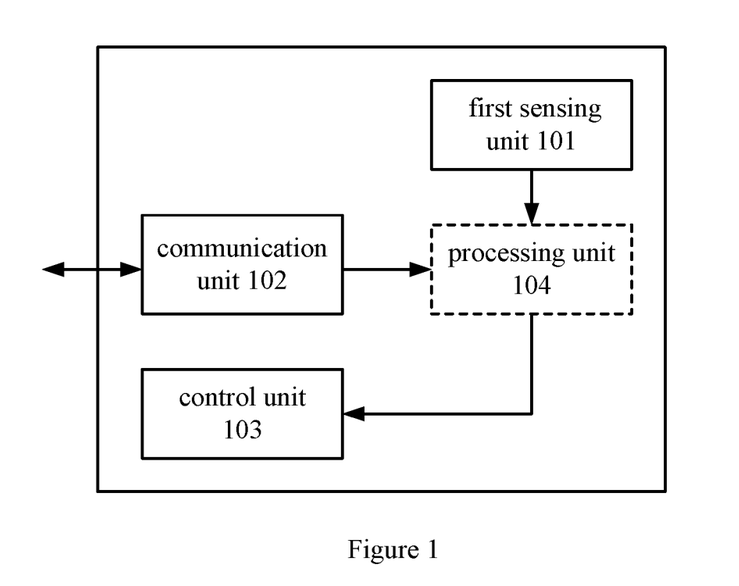
FIG. 1 is a functional block diagram illustrating configuration of an electronic apparatus according to the embodiments of this disclosure.

Firstly, a specific configuration of an electronic apparatus according to the embodiments of this disclosure will be described with reference to FIG. 1. As shown in FIG. 1, the electronic apparatus 100 includes a first sensing unit 101, a communication unit 102 and a control unit 103.

The first sensing unit 101 is for sensing first sensing data representing an action of the electronic apparatus 100. As to be described in the following, the action here refers to a mutual action between the electronic apparatus and a second apparatus to be connected such as a colliding action.

The communication unit 102 is a component for communicating with outside in the electronic apparatus 100. In particular, the communication unit 102 is for broadcasting first identification information of its own and the first sensing data sensed by the first sensing unit to an external second apparatus, and receives second identification information and second sensing data broadcasted from the external second apparatus. The communication unit 102 here is a communication unit using a wireless communication technique. The identification information here is information for identifying an apparatus uniquely. For example, in case of communication by blue-tooth, the identification information here is a blue-tooth address of the apparatus. Also for example, in case of communication by WiFi, if the apparatus is as a server, the identification information here may be a SSID, and if the apparatus is as a client, the identification information here may be an IP address of the apparatus.

Here, it should be noted that, both of the electronic apparatus 100 and the second apparatus are in a status in which they can be recognized by another apparatus, that is, the two apparatuses configure their own identification information as public and are in a range of a predetermined distance. Further, the external second apparatus here is not specific, as long as it is an external apparatus in the status in which it can be recognized by another apparatus.

The control unit 103 controls the electronic apparatus to execute a preset operation based on a decision result of whether the first sensing data and the second sensing data satisfying a predetermined condition. In particular, the predetermined condition means a condition indicating that the electronic apparatus 100 and the second apparatus are two apparatuses having executed the mutual action (for example, the colliding action).

In the electronic apparatus 100 according to the embodiments of this disclosure, by aid of broadcasting the sensing data indicating the action of the apparatus with the apparatus identification together and executing the preset operation between the two apparatuses based on whether the sensing data of one of the two apparatuses and the sensing data of the other of the two apparatuses are matched, the preset operation related to the second apparatus can be executed automatically once the user performs a specific simple action (for example, touch the electronic apparatus with the second apparatus), thus improving user convenience of usage of the apparatus and user experience of the usage of the apparatus.

According to the first embodiment of this disclosure, the electronic apparatus 100 may not have an ability of data processing. That is, a decision of whether the first sensing data and the second sensing data satisfying the predetermined condition is not executed at a side of the electronic apparatus 100. In this case, the communication unit 102 is further configured to transmit the first sensing data and the second sensing data to an external third apparatus connected thereto and receive command information transmitted by the third apparatus.

The external third apparatus is configured to analyze the first sensing data and the second sensing data, to decide whether the first sensing data and the second sensing data satisfy the predetermined condition and transmit the command information indicating a decision result to the electronic apparatus. Here, unlike the second apparatus being not specific, the third apparatus is a specific apparatus having a stronger ability of data processing and having established a connection (preferably, a wireless connection) with the electronic apparatus 100.

According to the second embodiment of this disclosure, the electronic apparatus 100 may also have an ability of data processing. That is, unlike the first embodiment, the decision whether the first sensing data and the second sensing data satisfy the predetermined condition is executed at the electronic apparatus 100. In this case, the electronic apparatus 100 may further include: a processing unit 104 (shown in a dash line in FIG. 1) for analyzing the first sensing data and the second sensing data to decide whether the first sensing data and the second sensing data satisfy the predetermined condition. The control unit 103 controls the electronic apparatus 100 to execute the first preset operation when the processing unit 104 decides that the first sensing data and the second sensing data satisfy the predetermined condition. On the other hand, when the processing unit 104 decides that the first sensing data and the second sensing data do not satisfy the predetermined condition, the control unit 103 controls the electronic apparatus 100 to execute a second preset operation.

For example, the first preset operation may be establishing a connection with the second apparatus. The connection here may be a direct connection, i.e., a point-to-point connection. The point-to-point connection here is with respect to a one-to-many broadcast at the time of recognizing other apparatuses hereinbefore. Or the connection here may also be indirect connection, i.e. a connection through a server. After the connection with the second apparatus being established, an exchange of data (for example, exchange of data such as pictures, documents or the like) may be further executed between the apparatus. Of course, this disclosure is not limited thereto. Also for example, the first preset operation may also add only a user of the second apparatus as a friend without establishing the connection between the electronic apparatus and the second apparatus.

Further, since the processing unit 104 deciding that the first sensing data and the second sensing data do not satisfy the predetermined condition means that the electronic apparatus 100 and the second apparatus are not the two apparatuses executing the mutual action, in this case, subsequent operations are no longer executed, that is, the second preset operation is non-execution of the subsequent operations.

Next, different examples of types of the sensing unit included in the electronic apparatus 100, various kinds of types of the sensing data, and specific procedure of deciding whether the sensing data of one of the two apparatuses and the sensing data of the other of the two apparatuses satisfy the predetermined condition by the processing unit 104 are described detailed.

A First Example

Figure 2:
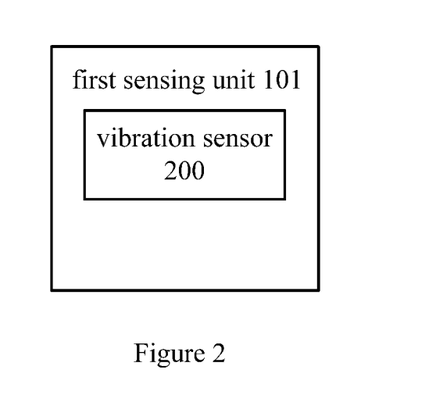
FIG. 2 is a functional block diagram illustrating a first example of a component for sensing data of an action of an electronic apparatus 100 included in the electronic apparatus according to the embodiments of this disclosure.

FIG. 2 illustrates the first example of a component for sensing sensing data of an action of the electronic apparatus 100 included in the electronic apparatus according to the embodiments of this disclosure. In the first example, the first sensing unit 101 may include a vibration sensor 200. In this case, the first sensing data may include a first vibration frequency and the second sensing data may include a second vibration frequency. For example, in case that the above mutual action between the electronic apparatus 100 and the second apparatus is the colliding action, the colliding action of the apparatus must cause a variation of the vibration frequency, in particular, for the apparatus which does not collide, the vibration frequency thereof is almost zero, and for the apparatus which collides, the vibration frequency thereof is larger than zero, and for the two apparatuses which collide with each other, the vibration frequencies thereof are equal or almost equal to each other. Therefore, the predetermined condition may include a difference between the first vibration frequency and the second vibration frequency being less than a first threshold. That is, when the processing unit 104 analyzes the first vibration frequency and the second vibration frequency and decides that the difference between the first vibration frequency and the second vibration frequency is less than the first threshold, the control unit 103 controls the electronic apparatus to execute the first preset operation.

A Second Example

Figure 3:
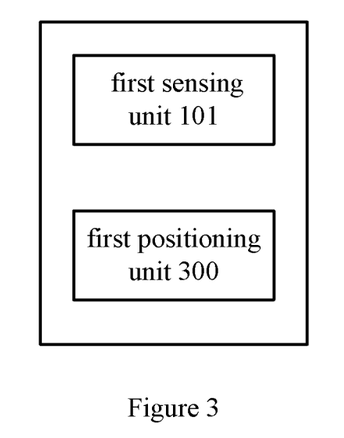
FIG. 3 is a functional block diagram illustrating a second example of the component for sensing the data of the action of the electronic apparatus 100 included in the electronic apparatus according to the embodiments of this disclosure.

FIG. 3 illustrates the second example of the component for sensing the data of the action of the electronic apparatus 100 included in the electronic apparatus according to the embodiments of this disclosure. In the second example, in addition to the first sensing unit, the electronic apparatus 100 may further include: a first positioning unit 300 for acquiring first position information of the electronic apparatus. Correspondingly, the second apparatus may further include a second positioning unit. At this time, the communication unit 102 is further for receiving second position information of the second apparatus broadcasted from the second apparatus. For example, in case that the above mutual action between the electronic apparatus 100 and the second apparatus is the colliding action, the colliding action of the apparatus must cause the variation of the vibration frequency, and for the two apparatuses which collide with each other, the vibration frequency thereof are equal or almost equal to each other. However, there may be an exceptional case in which the two apparatuses do not collide with each other and the vibration frequencies thereof are almost equal to each other. In order to avoid an erroneous decision due to this case, in the second example, a decision of distance may be added. That is, for the two apparatuses which collide with each other, they must be very close, i.e., a distance there between is less than a specific threshold. In particular, in the second example, in addition to the difference between the first vibration frequency and the second vibration frequency being less than the first threshold, the predetermined condition further includes a distance between positions represented by the first position information and the second position information being less than a second threshold. When the processing unit 104 analyzes the first vibration frequency and the second vibration frequency as well as the first position information and the second position information and decides that the difference between the first vibration frequency and the second vibration frequency is less than the first threshold and the distance between the positions represented by the first position information and the second position information is less than the second threshold, the control unit 103 controls the electronic apparatus to execute the first preset operation.

A Third Example

Figure 4:
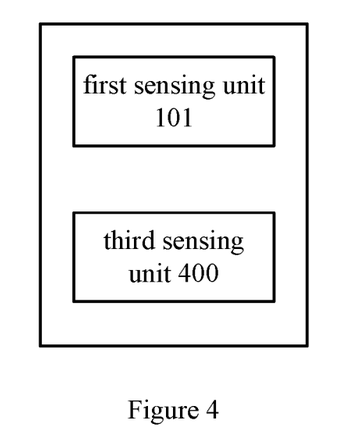
FIG. 4 is a functional block diagram illustrating a third example of the component for sensing the data of the action of the electronic apparatus 100 included in the electronic apparatus according to the embodiments of this disclosure.

FIG. 4 illustrates the third example of the component for sensing the data of the action of the electronic apparatus 100 included in the electronic apparatus according to the embodiments of this disclosure. In the third example, in addition to the first sensing unit 101, the electronic apparatus 100 may further include: a third sensing unit 400 for sensing third sensing data for representing the action of the electronic apparatus. Unlike the first sensing data, the third sensing data is data embodying the action of the apparatus more accurately. Correspondingly, the second apparatus may further include a fourth sensing unit for sensing fourth sensing data for representing the action of the second apparatus. Unlike the second sensing data, the fourth sensing data is data embodying the action of the apparatus more accurately. The third sensing data and the fourth sensing data are sensing data of same type. In the third example, a preliminary decision is made by using the first sensing data and the second sensing data, and then a further decision is made by using the third sensing data and the fourth sensing data.

In particular, when the processing unit 104 determines that the first sensing data and the second sensing data satisfy the predetermined condition, the communication unit 102 is further configured to establish a point-to-point connection with the second apparatus based on the second identification information and receive the fourth sensing data from the second apparatus. At this time, the established point-to-point connection is a temporary connection, i.e., a connection needing a further authentication.

Then, the processing unit 104 is further configured to compare the third sensing data and the fourth sensing data to determine whether they are matched.

When the processing unit 104 determines that the third sensing data and the fourth sensing data are not matched, the communication unit 102 is further configured to disconnect the point-to-point connection with the second apparatus, that is, the temporary connection is not authenticated. On the other hand, when the processing unit 104 determines that the third sensing data and the fourth sensing data are matched, the communication unit 102 is further configured to maintain the point-to-point connection with the second apparatus, that is, the temporary connection has been authenticated.

For example, the third sensing unit may include an acceleration sensor and a gyroscope for acquiring first acceleration information and first moving direction information of the electronic apparatus. Correspondingly, the second sensing unit in the second apparatus may also include an acceleration sensor and a gyroscope for acquiring second acceleration information and second moving direction information of the second apparatus. In this case, the communication unit 102 is further for receiving the second acceleration information and the second moving direction information of the second apparatus broadcasted from the second apparatus.

In case that the mutual action between the electronic apparatus 100 and the second apparatus is the colliding action as above, the colliding action of the apparatus must cause a variation of an acceleration of the apparatus, and for the two apparatuses which collide with each other, their accelerations are equal or almost equal to each other, and moving directions thereof are opposite to each other. In this case, the predetermined condition may include a difference between the accelerations represented by the first acceleration information and the second acceleration information being less than a third threshold and moving directions represented by the first moving direction information and the second moving direction information being opposite to each other.

Alternatively, when the processing unit 104 analyzes the first sensing data and the second sensing data as well as the third sensing data and the fourth sensing data to decide they satisfy the predetermined condition, the control unit 103 controls the electronic apparatus to execute the first preset operation, the first preset operation here is an operation other than establishing the connection with the second apparatus.

A Fourth Example

Figure 5:
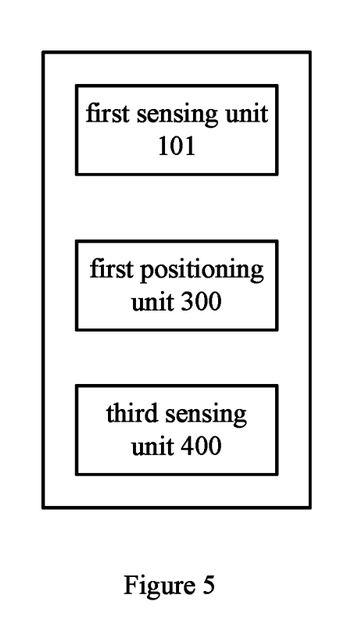
FIG. 5 is a functional block diagram illustrating a fourth example of the component for sensing the data of the action of the electronic apparatus 100 included in the electronic apparatus according to the embodiments of this disclosure.

FIG. 5 illustrates the fourth example of the component for sensing the data of the action of the electronic apparatus 100 included in the electronic apparatus according to the embodiments of this disclosure. In the fourth example, on a basis of the second example, the electronic apparatus 100 further includes a third sensing unit 400, wherein the third sensing unit 400 includes an acceleration sensor and a gyroscope for acquiring first acceleration information and first moving direction information of the electronic apparatus. The communication unit 102 is further for receiving second acceleration information and second moving direction information of the second apparatus broadcasted from the second apparatus.

The processing unit 104 is further for acquiring a first moving track based on the first position information, the first acceleration information and the first moving direction information, and acquiring a second moving track based on the second position information, the second acceleration information and the second moving direction information, and deciding whether there is an intersecting point of the first moving track and the second moving track.

Correspondingly, the predetermined condition further include that there is the intersecting point of the first moving track and the second moving track.

Four examples are described above only by way of taking examples. Those skilled in the art can understand that this disclosure is not limited thereto. Based on a general inventive concept of this disclosure, one or more components in the first example to the fourth example can be combined or replaced. For example, in a fifth example, the electronic apparatus 100 includes a vibration detector, a positioning unit, an acceleration sensor and a gyroscope, and alternatively, the electronic apparatus 100 can only includes a positioning unit, an acceleration sensor and a gyroscope.

Also, a form of the electronic apparatus according to the embodiments of this disclosure may be a wearable type apparatus which can be worn by the user. In this case, the electronic apparatus 100 includes a body device; and a fixing device connected to the body device and for fixing a relative position relationship with the user of the electronic apparatus.

In this configuration, the first sensing unit 101 is positioned at the body device or the fixing device, and the communication unit 102 is positioned at the body device or the fixing device, and the control unit 103 is positioned at the body device or the fixing device. Further, the processing unit 104 and other various kinds of sensors may also be positioned at the body device or the fixing device.

For example, the wearable type apparatuses may be intelligent shoes worn on feet of the user. In this case, the mutual action between the apparatuses may be the colliding action. Of course, this disclosure is not limited thereto. For example, the wearable type apparatus may also be a smart hand ring worn on a wrist of the user or a smart finger ring. In this case, the mutual action between the apparatuses may be a hand clap action or a handshake action.

Figure 6:
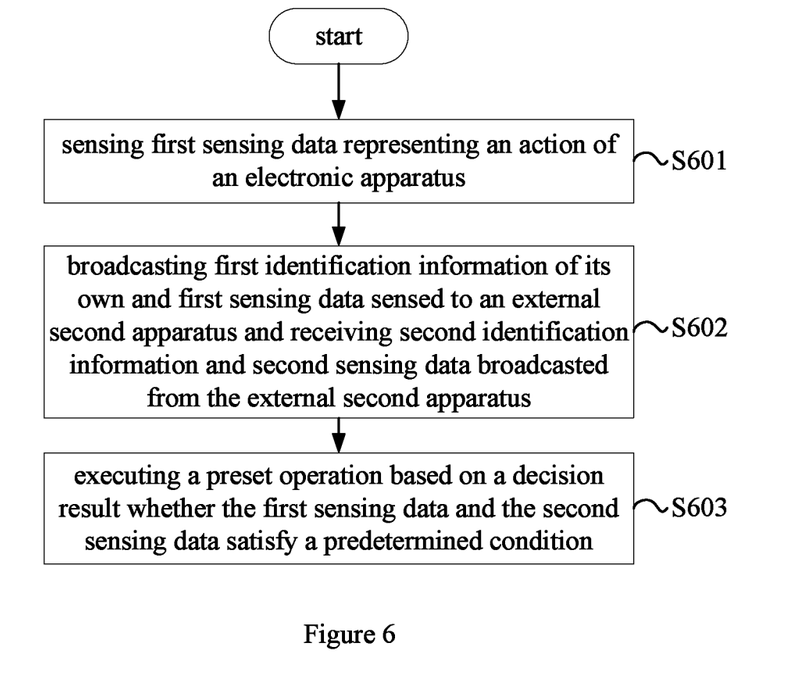
FIG. 6 is a flowchart illustrating a procedure of an information processing method according to the embodiments of this disclosure.

The electronic apparatus according to the embodiments of this disclosure are described detailed with reference to FIGS. 1 to 5 hereinbefore. Next, an information processing method according to the embodiments of this disclosure will be described with reference to FIG. 6. The information processing method is applied to the above electronic apparatus. As shown in FIG. 6, the method includes the following steps.

First, in step S601, first sensing data representing an action of the electronic apparatus is sensed.

Then, in step S602, first identification information of its own and the first sensing data sensed are broadcasted to an external second apparatus, and second identification information and second sensing data broadcasted from the external second apparatus are received.

At last, in step S603, a preset operation is executed based on a decision result whether the first sensing data and the second sensing data satisfy a predetermined condition.

In the information processing method according to the embodiments of this disclosure, by aid of broadcasting the sensing data indicating the action of the apparatus with the apparatus identification together and executing the preset operation between the two apparatuses based on whether the sensing data of one of the two apparatuses and the sensing data of the other of the two apparatuses are matched, the preset operation related to the second apparatus can be executed automatically once the user performs a specific simple action (for example, touch the electronic apparatus with the second apparatus), thus improving user convenience of usage of the apparatus and user experience of the usage of the apparatus.

According to the first embodiment of this disclosure, the electronic apparatus 100 may not have an ability of data processing. In this case, the method may further include: transmitting the first sensing data and the second sensing data to an external third apparatus connected thereto and receiving command information transmitted by the third apparatus, wherein the external third apparatus is configured to analyze the first sensing data and the second sensing data and decide whether the first sensing data and the second sensing data satisfy the predetermined condition and transmit the command information indicating the decision result to the electronic apparatus.

According to the second embodiment of this disclosure, the electronic apparatus 100 may also have an ability of data processing. In this case, the method may further include: analyzing the first sensing data and the second sensing data to determine whether the first sensing data and the second sensing data satisfy the predetermined condition; and executing a first preset operational when it is decided that the first sensing data and the second sensing data satisfy the predetermined condition.

Next, different examples of various kinds of types of the sensing data and a specific procedure of deciding whether the sensing data of the two apparatuses satisfy the predetermined condition are described detailed.

As in the above first example, the first sensing data include first vibration frequency and the second sensing data include second vibration frequency, and the predetermined condition is a difference between the first vibration frequency and the second vibration frequency being less than a first threshold.

As in the above second example, the method may further include: acquiring first position information of the electronic apparatus and receiving second position information of the second apparatus broadcasted from the second apparatus. Here, the predetermined condition further includes a distance between positions represented by the first position information and the second position information being less than a second threshold.

As in the above third example, the method may further include: sensing third sensing data representing the action of the electronic apparatus; establishing a point-to-point connection with the second apparatus based on the second identification information when it is determined that the first sensing data and the second sensing data satisfy the predetermined condition and receiving fourth sensing data from the second apparatus, wherein the third sensing data and the fourth sensing data are sensing data of same type; comparing the third sensing data and the fourth sensing data and determining whether the third sensing data and the fourth sensing data are matched, and disconnecting the point-to-point connection with the second apparatus when the it is determined that the third sensing data and the fourth sensing data are not matched, and maintaining the point-to-point connection when it is determined that the third sensing data and the fourth sensing data are matched.

As in the above fourth example, the method may further include: acquiring first acceleration information and first moving direction information of the electronic apparatus; and receiving second acceleration information and second moving direction information of the second apparatus broadcasted from the second apparatus.

And, on an above basis, the method may further include: acquiring a first moving track based on the first position information, the first acceleration information and the first moving direction information, and acquiring a second moving track based on the second position information, the second acceleration information and the second moving direction information; and deciding whether there is an intersecting point of the first moving track and the second moving track.

Correspondingly, the predetermined condition further include that there is the intersecting point of the first moving track and the second moving track.

Since a processing procedure of the information processing method according to the embodiments of this disclosure completely corresponds to the above specific configuration of the electronic apparatus, a detail thereof is no longer described detailed in order to avoid redundancy.

Heretofore, the electronic apparatus and the information processing method according to the embodiments of this disclosure are described detailed with reference to FIGS. 1 to 6. In the electronic apparatus and the information processing method according to the embodiments of this disclosure, by aid of broadcasting the sensing data indicating the action of the apparatus with the apparatus identification together and executing the preset operation between the two apparatuses based on whether the sensing data of one of the two apparatuses and the sensing data of the other of the two apparatuses are matched, the preset operation related to the second apparatus can be executed automatically once the user performs a specific simple action (for example, touch the electronic apparatus with the second apparatus), thus improving user convenience of usage of the apparatus and user experience of the usage of the apparatus.

It should be explained that, in the specification, terms of "comprise", "include" and any other variations thereof intends to cover non-exclusive inclusion so that a procedure, a method, a product or an equipment including a series of elements not only includes these elements, but also include other elements which are not listed explicitly, or also include inherent elements of these procedure, method, product or equipment. In case that there is no more limitation, the element defined by statement "including one . . . " does not exclude there is additional same element in the procedure, method, article or apparatus including the element.

Finally, it should be noted that a series of processing described above does not only include processing executed chronologically in order mentioned here, and also include processing executed in parallel or individually but not chronologically.

With the description of the above implementations, those skilled in the art can clearly understand that the present invention can be implemented by means of software plus necessary software platform, of course, it can be implemented by software totally. Based on such understanding, the technical solution of this disclosure essentially or the part contributed to the conventional description can be embodied by a form of a software product, the computer software product can be stored in a storage medium, such as a ROM/RAM, a magnetic disc, an optical disk or the like, it includes some instructions to cause a computer equipment (it may be a personal computer, a server or a network equipment or the like) to execute the method according to the respective embodiments of a certain part of the embodiments.

The present invention is described detailed above, the principle and the implementation mode of the present invention are explained by applying specific example in the text, and the above explanation of the embodiments is only for understanding the method of the present invention and the kernel idea thereof. Meanwhile, for those skilled in the art, the specific implementation and the specific application of this disclosure may be changed according to the concept of this disclosure, thus in summary, the content in the specification should not be understood as a limitation to this disclosure.

The invention claimed is:

1. An electronic apparatus comprising:
   a first sensor configured to sense first sensing data representing an action of the electronic apparatus;
   a communication module configured to broadcast first identification information of its own and first sensing data sensed by the first sensing unit to an external second apparatus, and to receive second identification information and second sensing data broadcasted from the external second apparatus; and
   a processor configured to control the electronic apparatus to execute a preset operation based on a decision result whether the first sensing data and the second sensing data satisfy a predetermined condition;
   wherein the first sensor includes a vibration detector, the first sensing data includes first vibration frequency and the second sensing data includes second vibration frequency, and the predetermined condition includes a difference between the first vibration frequency and the second vibration frequency being less than a first threshold;
   a third sensor configured to sense third sensing data representing the action of the electronic apparatus,
   wherein the communication module is further configured to establish a point-to-point connection with the second apparatus based on the second identification information and to receive fourth sensing data from the second apparatus when the processor determines that the first sensing data and the second sensing data satisfy the predetermined condition, and the third sensing data and the fourth sensing data are sensing data of same type;
   the processor is further configured to compare the third sensing data and the fourth sensing data and to determine whether the third sensing data and the fourth sensing data are matched, and
   the communication module is further configured to disconnect the point-to-point connection with the second apparatus when the processor determines that the third sensing data and the fourth sensing data are not matched, and to maintain the point-to-point connection when the processor determines that the third sensing data and the fourth sensing data are matched.

2. The electronic apparatus according to claim 1, wherein the communication module is further configured to transmit the first sensing data and the second sensing data to an external third apparatus connected thereto and to receive command information transmitted by the third apparatus;

wherein the external third apparatus is configured to analyze the first sensing data and the second sensing data, to decide whether the first sensing data and the second sensing data satisfy the predetermined condition, and to transmit the command information indicating the decision result to the electronic apparatus.

3. The electronic apparatus according to claim 1, wherein the processor is configured to analyze the first sensing data and the second sensing data and to decide whether the first sensing data and the second sensing data satisfy the predetermined condition and the electronic apparatus to execute a first preset operation when the processor decides that the first sensing data and the second sensing data satisfy the predetermined condition.

4. The electronic apparatus according to claim 1, further comprising:
a first positioning sensor configured to acquire first position information of the electronic apparatus,
wherein the communication module is further configured to receive second position information of the second apparatus broadcasted from the second apparatus;
the predetermined condition further includes a distance between positions represented by the first position information and the second position information being less than a second threshold.

5. The electronic apparatus according to claim 4, further comprising an acceleration sensor and a gyroscope configured to acquire first acceleration information and first moving direction information of the electronic apparatus respectively;
wherein the communication module is further configured to receive second acceleration information and second moving direction information of the second apparatus broadcasted from the second apparatus.

6. The electronic apparatus according to claim 5, wherein the processor is further configured to acquire a first moving track based on the first position information, the first acceleration information and the first moving direction information, to acquire a second moving track based on the second position information, the second acceleration information and the second moving direction information, and to decide whether there is an intersecting point of the first moving track and the second moving track;
wherein the predetermined condition further includes that there is the intersecting point of the first moving track and the second moving track.

7. The electronic apparatus according to claim 1, comprising:
a body device;
a fixing device connected to the body device and for fixing a relative position relationship with a user of the electronic apparatus;
wherein the first sensor is positioned at the body device or the fixing device, and the communication module is positioned at the body device or the fixing device, and the processor is positioned at the body device or the fixing device.

8. An information processing method applied in an electronic apparatus, the information processing method comprising:
sensing first sensing data representing an action of the electronic apparatus by a first sensor;
broadcasting first identification information of its own and first sensing data sensed to an external second apparatus and receiving second identification information and second sensing data broadcasted from the external second apparatus; and
executing a preset operation based on a decision result whether the first sensing data and the second sensing data satisfy a predetermined condition,
wherein the first sensing data includes first vibration frequency and the second sensing data includes second vibration frequency, and the predetermined condition is a difference between the first vibration frequency and the second vibration frequency being less than a first threshold;
sensing third sensing data representing the action of the electronic apparatus,
establishing a point-to-point connection with the second apparatus based on the second identification information when it is determined that the first sensing data and the second sensing data satisfy the predetermined condition, and receiving fourth sensing data of the second apparatus, the third sensing data and the fourth sensing data being sensing data of same type;
comparing the third sensing data and the fourth sensing data and determining whether the third sensing data and the fourth sensing data are matched, and
disconnecting the point-to-point connection with the second apparatus when it is determined that the third sensing data and the fourth sensing data are not matched, and maintaining the point-to-point connection when it is determined that the third sensing data and the fourth sensing data are matched.

9. The information processing method according to claim 8, further comprising:
transmitting the first sensing data and the second sensing data to an external third apparatus connected thereto and receiving command information transmitted by the external third apparatus;
wherein the external third apparatus is configured to analyze the first sensing data and the second sensing data, to decide whether the first sensing data and the second sensing data satisfy the predetermined condition, and to transmit the command information indicating the decision result to the electronic apparatus.

10. The information processing method according to claim 8, further comprising:
analyzing the first sensing data and the second sensing data and determining whether the first sensing data and the second sensing data satisfy the predetermined condition; and
executing a first preset operational when it is decided that the first sensing data and the second sensing data satisfy the predetermined condition.

11. The information processing method according to claim 8, further comprising:
acquiring first position information of the electronic apparatus and receiving second position information of the second apparatus broadcasted from the second apparatus,
wherein the predetermined condition further includes a distance between positions represented by the first position information and the second position information being less than a second threshold.

12. The information processing method according to claim 11, further comprising:
acquiring first acceleration information and first moving direction information of the electronic apparatus;
receiving second acceleration information and second moving direction information of the second apparatus broadcasted from the second apparatus.

13. The information processing method according to claim 12, further comprising:
acquiring a first moving track based on the first position information, the first acceleration information and the first moving direction information, and acquiring a second moving track based on the second position information, the second acceleration information and the second moving direction information;
deciding whether there is an intersecting point of the first moving track and the second moving track;
wherein the predetermined condition further includes that there is the intersecting point of the first moving track and the second moving track.

* * * * *

UNITED STATES PATENT AND TRADEMARK OFFICE
CERTIFICATE OF CORRECTION

PATENT NO. : 9,930,126 B2
APPLICATION NO. : 14/978779
DATED : March 27, 2018
INVENTOR(S) : Yan Zhao It is certified that error appears in the above-identified patent and that said Letters Patent is hereby corrected as shown below:

In the Claims

In Column 13, Claim 3, Line 21, after the word "condition" insert --;--

In Column 13, Claim 3, Line 21, after the word "and" insert --wherein the processor controls--

Signed and Sealed this
Sixth Day of August, 2019

Andrei Iancu
*Director of the United States Patent and Trademark Office*